United States Patent [19]

Huang

[11] Patent Number: 5,307,890

[45] Date of Patent: May 3, 1994

[54] CHASSIS STRUCTURE FOR A REMOTE CONTROLLED CHILD DRIVEN ELECTRIC CAR

[76] Inventor: Kuo-Chang Huang, No. 68 Yau-Her Street, Taipei, Taiwan

[21] Appl. No.: 962,728

[22] Filed: Oct. 19, 1992

[51] Int. Cl.$^5$ .................... B60K 1/00; B62D 21/02
[52] U.S. Cl. ..................... 180/65.1; 180/68.5; 180/90.6; 180/908; 280/798; 296/204; 446/471
[58] Field of Search .............. 180/65.1, 65.6, 68.5, 180/90.6, 167, 291, 908; 280/291, 781, 797, 798; 296/204; 446/465, 470, 471

[56] References Cited

U.S. PATENT DOCUMENTS

| | | | |
|---|---|---|---|
| 2,352,111 | 6/1944 | Meyer | 180/68.5 |
| 3,751,065 | 8/1973 | Sullivan | 446/465 X |
| 4,351,406 | 9/1982 | Lay | 180/65.1 |
| 4,407,383 | 10/1983 | Enokimoto et al. | 180/908 X |
| 4,470,219 | 9/1984 | Sugimoto | 446/471 X |
| 4,682,668 | 7/1987 | Salmon et al. | 180/908 X |
| 5,193,879 | 3/1993 | Chen | 180/65.1 X |

FOREIGN PATENT DOCUMENTS

| | | | |
|---|---|---|---|
| 3216760 | 11/1983 | Fed. Rep. of Germany | 180/65.1 |
| 3429539 | 2/1986 | Fed. Rep. of Germany | 446/470 |

Primary Examiner—Brian L. Johnson
Attorney, Agent, or Firm—Bacon & Thomas

[57] ABSTRACT

An improved structure for a child-driven electric car which can be safely remotely controlled. A propulsion mechanism driven by a motor is disposed at the rear of the electric car, and a base board is welded under the rear end of the car frame for mounting a seat. An arch base is disposed under a central portion of the car frame. Pedals on the car have a starting switch and a brake switch step, while an operating switch control box is located on a central portion of the car frame. The child can easily drive the car, while the adults can use the remote controller to control the safety controller on the electric car for controlling the moving direction of the electric car so as to prevent the electric car from going into any dangerous area and thus avoid injury of the child.

5 Claims, 6 Drawing Sheets

CHASSIS STRUCTURE FOR A REMOTE CONTROLLED CHILD DRIVEN ELECTRIC CAR

BACKGROUND OF THE INVENTION

As shown in FIG. 1, a conventional child-played car is pedal-driven by a child. Such child-operated car has a chain under its frame for power transmission. When such a mechanical car is changed into an electrical car, the transmission is removed and other basic elements containing circuit wires and auxiliary safety device are mounted. These circuit wires must be hidden for each assembly, to keep a beautiful appearance and to avoid damage. Furthermore, the conventional car frame has many support boards welded thereon. These support boards are formed with threaded holes or through holes which are disposed with a certain processing error. In addition, the support boards often cannot be accurately mounted in their true positions. Also, it requires much time to assembly these elements.

Moreover, a conventional mechanical pedal-type of child-operated car is not designed with any safety device to control the movement of the car. In contrast to the conventional car, an electric child-driven car can be equipped with a safety control device which permits the car to be remotely controlled so that the moving direction of the car can be immediately changed to prevent the car from moving toward a dangerous area.

SUMMARY OF THE INVENTION

It is an object of this invention to provide an improved structure of child-driven electric car which can be safely remotely controlled, wherein a propulsion mechanism driven by a motor is disposed on the rear wheel shaft of the electric car, and a base board is welded under the rear end of the car frame for placing a seat thereon. An arch base is disposed under the central portion of the car frame. The arch base is formed with a charging socket hole, a circuit wire, a receiving antenna opening, a battery and a safety controller. Two pedal shafts are disposed on two sides of the front and rear ends of the battery support of the arch base and two pedals are fitted on the pedal shafts and secured thereto by spring clips. The pedals are disposed with a starting switch step, a brake switch step and an operating switch control box which is located on the central portion of the car frame. The child can easily drive the car, while the adults can use the remote controller to control the safety controller on the electric car for controlling the moving direction of the electric car so as to prevent the electric car from going into any dangerous area and thus avoid injury of the child.

DETAILED DESCRIPTION OF THE PREFERRED EMBODIMENTS

Figure 1:
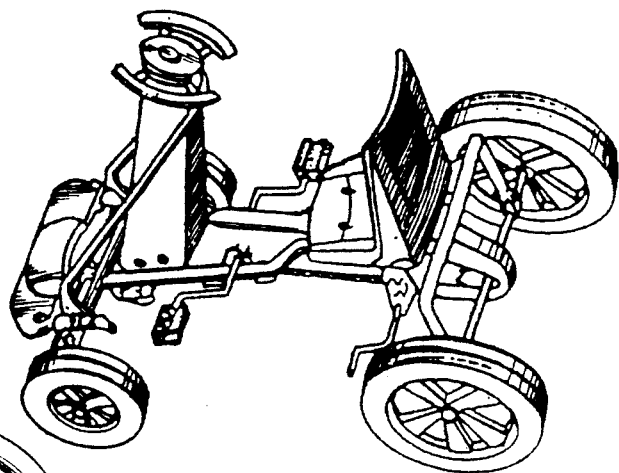
FIG. 1 is a perspective view of a conventional child-operated car.
Figure 2:
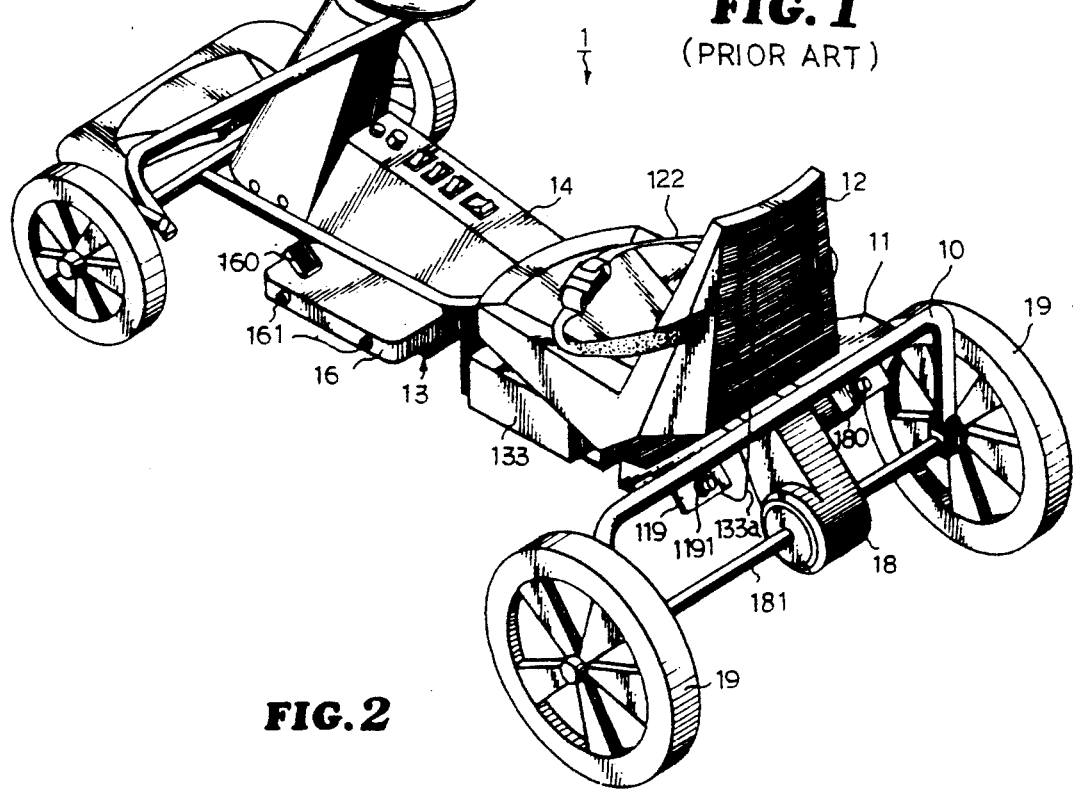
FIG. 2 is a perspective view of the present invention.
Figure 5:
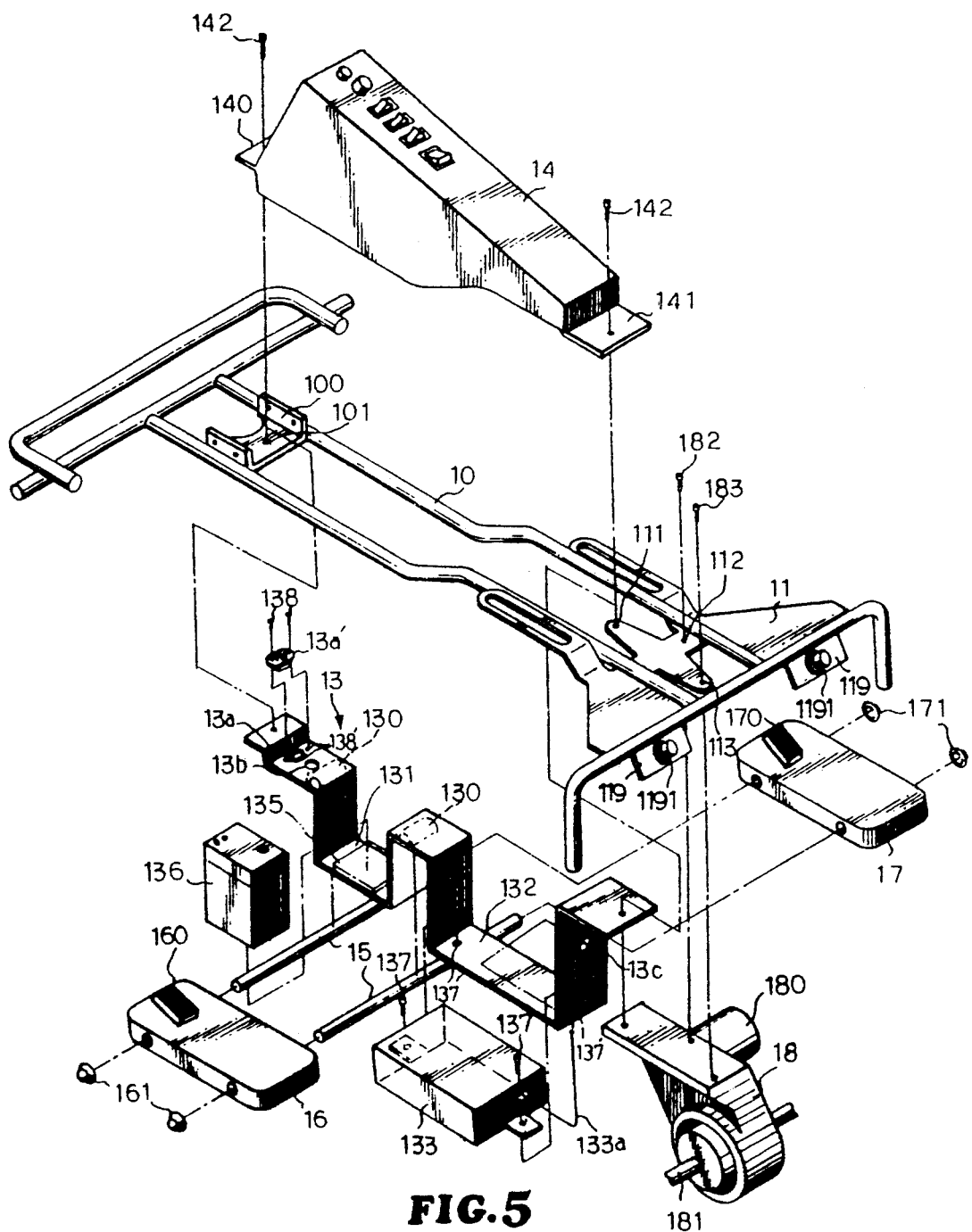
FIG. 5 is an exploded, perspective view of the car frame and the elements of the chassis of this invention.

Please refer to FIG. 2 which shows a perspective view of this invention, wherein a control box 14 containing operating switches and circuits is disposed at a central position of the car frame 10 of the child-operated electrical car 1. An arch base 13 is mounted under the car frame 10 (as shown in FIG. 5). On the base 13 are placed a charging socket hole, openings for circuit wires, battery 136 for supplying power, and a safety controller 133. A battery support 131 is disposed on the bottom of the base 13 and two pedal shafts 15 are welded on the battery support 131 near the front and rear ends thereof (as shown in FIG. 5). Two pedals 16, 17 are disposed on the pedal shafts 15. A rear base board 11 is disposed at the rear end of the car frame 10 and a propulsion mechanism 18 driven by a motor 180 is secured under the base board 11 by screws. The propulsion mechanism transmits power to rear wheels 19 through a main shaft 181.

Figure 3:
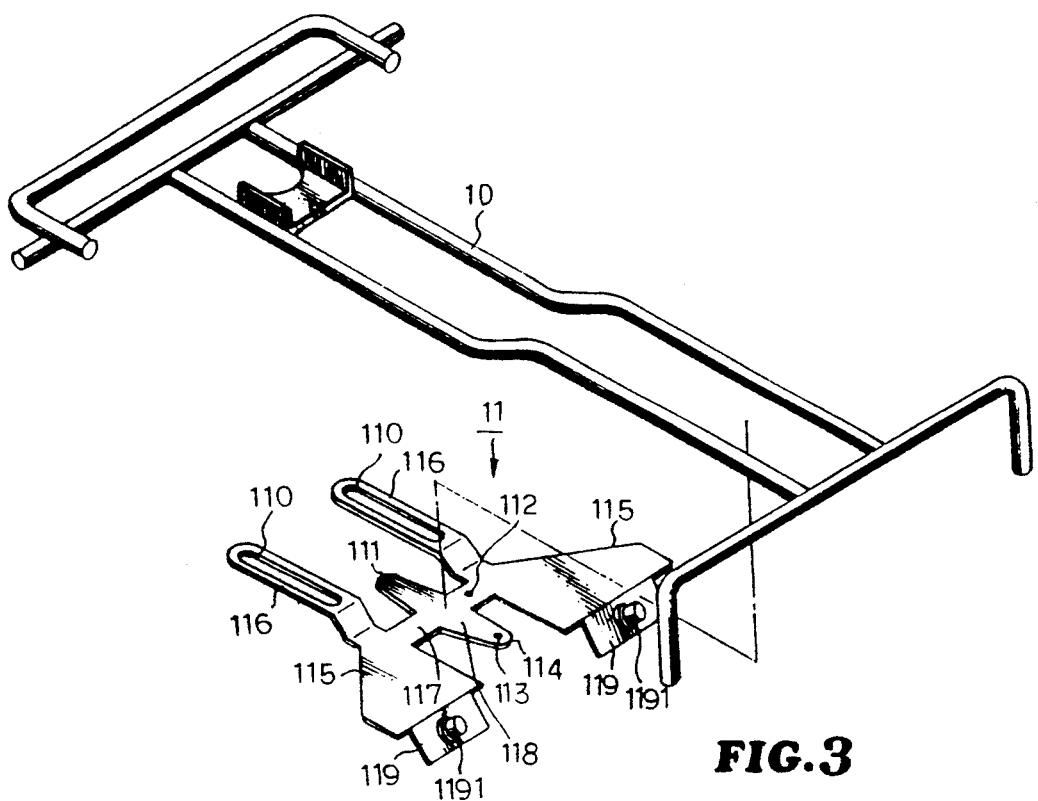
FIG. 3 is a perspective exploded view of the car frame and the base board of this invention.

Please now refer to FIG. 3, wherein it can be seen that the base board 11 has two portions 115, a body portion 114, two tail portions 116 behind the body portion 114, and two lateral arms 117 connecting the wing portions 115 with the body portion 114. One of the lateral arms 117 is formed with a through hole 112. The connections between the wing portion 115 and the tails 116 are upwardly bent. Each tail portion 116 is formed with an elongated hole 110. The front end of each wing portion 115 has a slanted portion 119 on which a small brake light 1191 is fixed. The base board 11 is integrally formed by a punch press and is welded under the rear end of the car frame 10.

Figure 4:
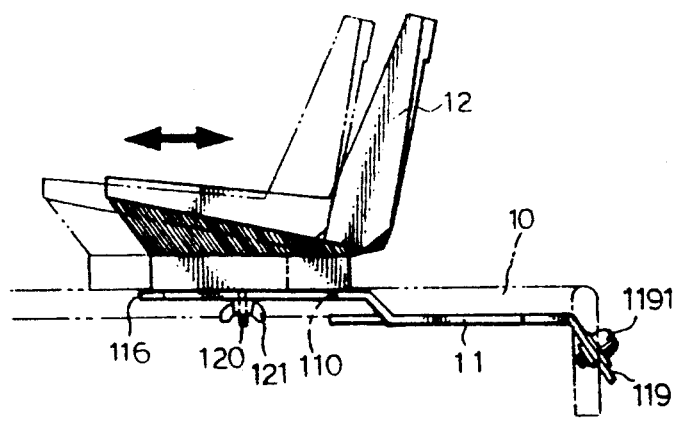
FIG. 4 is a partial, side view which shows the assembly of the seat and the base board on the car frame.

Please refer to FIG. 4, wherein a seat 12 is associated with the base board 11 mounted on the car frame 10. The seat 12 can be mounted in such a manner that adjustment screws 120 of the seat 12 extend through the elongated holes 110 of the base board 11 so as to cooperate with nuts for adjustably securing the seat 12 on the car frame 10.

Please refer to FIG. 5 which shows the main elements of the car frame and chassis of this invention, wherein a U-shaped seat member 100 is disposed near the front end of the car frame 10. A threaded hole 101 is formed in a central portion of the seat member 100. The control box 14 is inclined and two extension plates 140, 141 project outwards from the front and rear ends thereof. The extension plate 140 is secured to the seat member 100 by a screw 142 going through the threaded hole 101 of the seat member 100 while the extension plate 141 is secured to the base board 11 by a screw 142 going through the through hole 111 of the base board 11. The arch base 13 has two U-shaped supports one of which is the battery support 131 for disposing thereon a two-faced adhesive 135 and the battery 136, and the other of which is a safety controller support 132 for disposing thereon a safety controller 133. The safety controller 133 is secured to the support 132 by two screws 137 which go through two threaded holes 137, thereof. The arch base 13 and control box 14 are both secured to the U-shaped seat 100 and the base board 11 by the screws 142 which go through the threaded holes 101 of the U-shaped seat 100 and the through hole 111 of the butterfly base board 11.

The battery support 131 of the arch base 13 is formed with a charging socket hole 13a near the upper front end of the battery support 131. The charging socket hole 13a is used for placing a charging socket 13a' therein. The charging socket 13a' is secured to the lateral threaded holes 138' of the charging socket hole 13a by two screws 138 for supplementing power when the power of the battery 136 is insufficient. A circuit wire opening 13b is formed behind the charging socket hole 13a for extending the circuit wires through the opening 13b. A circuit wire opening 13c for driving motor 180 is formed on the rear end of the safety controller support 132 for extending the wires of the driving motor 180 therethrough and installing a receiving antenna 133a of the safety controller 133.

Figure 6:
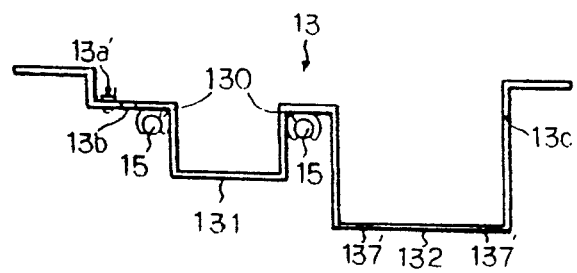
FIG. 6 is a side view of the arch base.

As can be seen in FIGS. 5 and 6 on the battery support 131 of the arch base 13 are welded C-shaped clamping rings 130 under two sides of the battery support 131. The clamping rings 130 hold the pedal shafts 15 which horizontally contact the arch base 13 and laterally extend from the bottom of the arch base 13. The pedals 16, 17 can be fitted onto the pedal shafts 15 and then spring clips 161, 171 are engaged with the ends of the pedal shafts 15 to fix the pedals 16, 17. Pedal 16 has a brake switch step 160 while pedal 17 has a starting switch step 170.

A propulsion mechanism 18 is secured to the body portion 114 of the base board 11 by means of screws 142, 182, 183 which respectively go through the holes 111, 112, 113 of the base board 11. The propulsion mechanism 18 serves as the main driving device of the child-operated electrical car.

Figure 7:
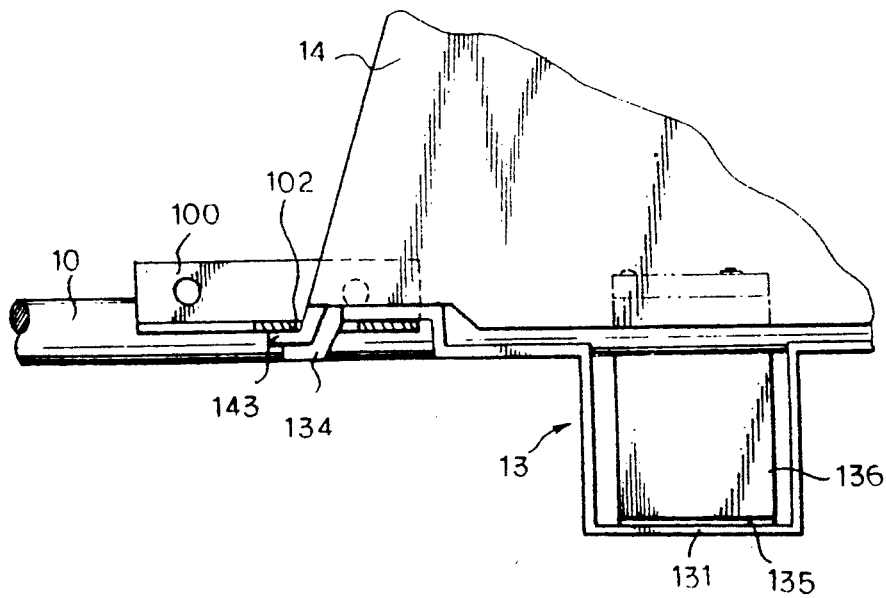
FIG. 7 is a partial side view which shows another embodiment of the assembly of the operating switch control box, arch base and the U-shaped seat member near the front end of the car frame.
Figure 8:
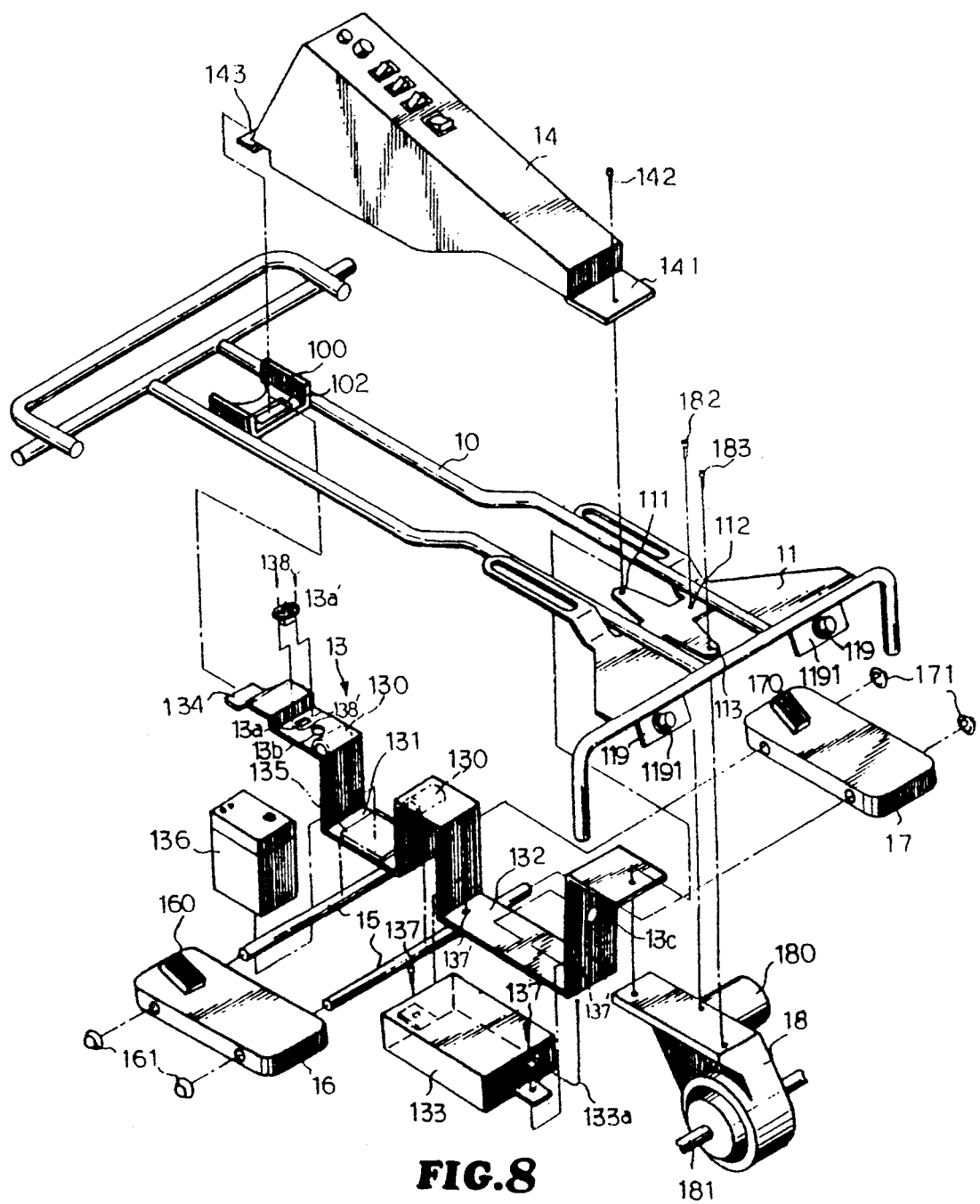
FIG. 8 is an exploded perspective view of the embodiment according to FIG. 7.

Please now refer to FIG. 7 which shows another embodiment of the combination of the arch base 13 and control box 14, wherein an angled fixing plate 134 extends from the front end of control box 14 and an identical angled fixing plate 134 is disposed at the front end of the arch base 13. Also, the U-shaped seat 100 of the car frame 10 is alternatively formed with a central rectangular hole 102 (as shown in FIG. 8). Accordingly, the two fixing plates 143, 134 can extend through the rectangular hole 102 and associate with each other. The read ends of the control box 14 and arch base 13 are still secured to the base board 11 by the screw 142 which goes through the through holes 111 thereof.

Please now refer to FIG. 8 which shows the alternative embodiment of this invention, in which the arch base 13 and control box 14 are secured to the car frame 10 simply by the rear screw 142 so that it is convenient to disassemble and maintain the electrical car, and in which the fixing plates 134, 143 of the arch base 13 and control box 14 can be inserted into the rectangular hole 102 of the U-shaped seat 100 and the rear ends thereof are still secured by screws 142 to the car frame 10.

Figure 9:
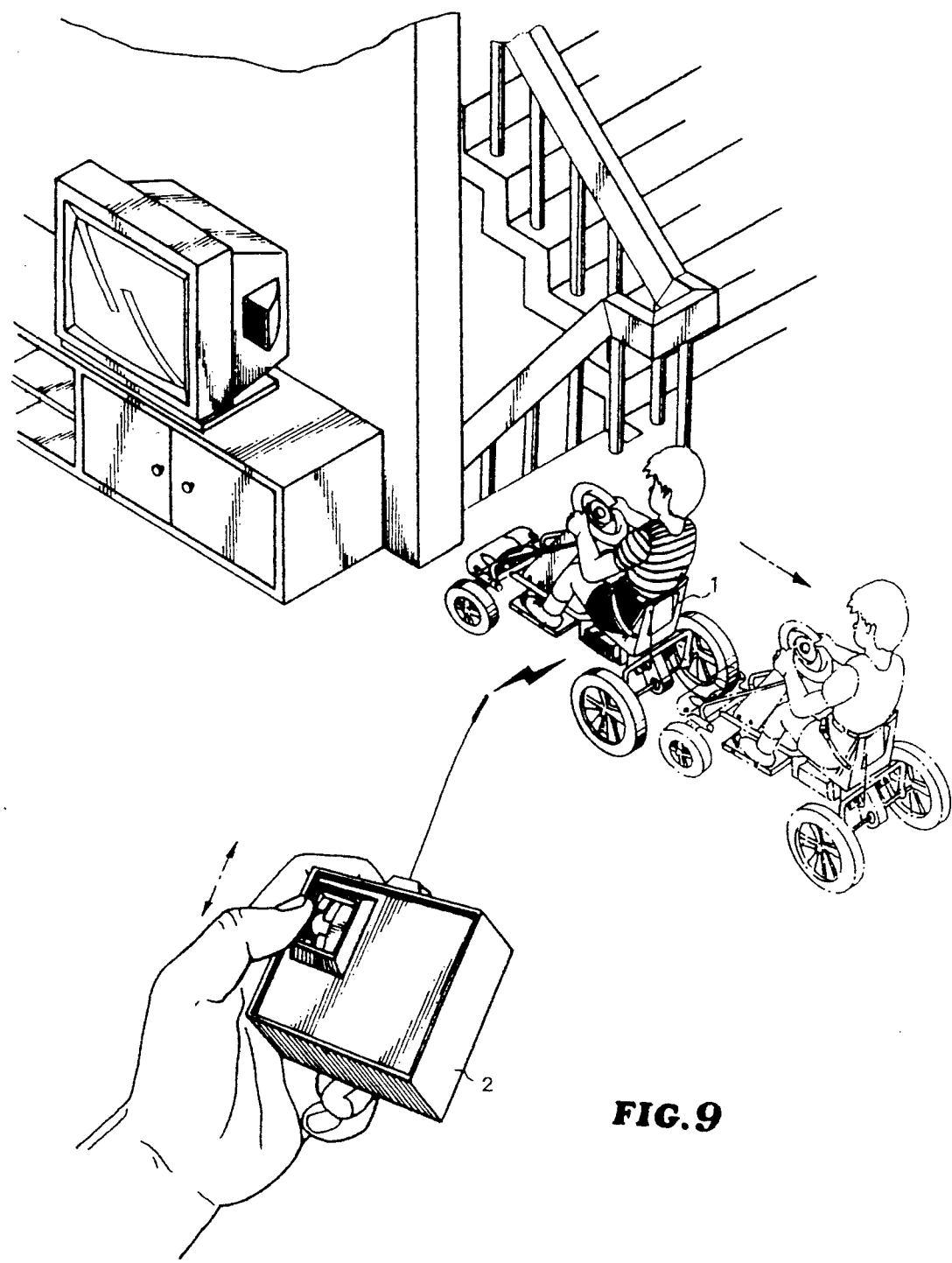
FIG. 9 is a pictorial view showing the application of this invention.

Please now refer to FIG. 9. The child-operated electric car 1 of this invention can be driven by a child indoors or outdoors. When driving the electric car indoors, there always are some dangerous areas such as stairs, furniture or electrical facilities, and the child drives the electrical car without sufficient judgment or proper reaction so that the child often may collide with the articles around the car or may even drive the electric car into the stairs or the glass of a large window to cause serious injury. At this time, an adult can use the remote safety controller 2 to immediately change the moving direction of the electric car to avoid danger and, also the parents can play with the child to enhance the relationship therebetween.

What is claimed is:

1. An improved chassis structure for a child-driven electric car which can be remotely controlled, comprising: a car frame, a generally U-shaped seat member attached to the frame, an operating switch control box attached to the car frame, an arch base attached to the frame, a seat located on the frame, a base board attached to the frame, pedal shafts having pedals thereon attached to the arch base, a battery, remote controller, safety controller, and a motor, the battery, safety controller and motor all attached to the arch base, and a propulsion mechanism driven by the motor, wherein:

said base board is integrally formed and is welded under a rear portion of said car frame, said control box and arch base having extending plates extending from opposite forward and rear ends said forward extending plates being respectively secured on said U-shaped seat member disposed at a front portion of said car frame and the rear extending plates secured on said base board disposed at a rear portion of said car frame, and further comprising C-shaped clamping, members for holding said pedal shafts mounted on said arch base, wherein said propulsion mechanism is secured under said base board.

2. The improved chassis structure as claimed in claim 1, wherein said arch base comprises a U-shaped battery support having front and rear ends and a safety controller support, said C-shaped clamping members disposed under said arch base being located at an upper edge of said battery support adjacent the front and rear ends thereof.

3. The improved chassis structure as claimed in claim 1, wherein said base board comprises a body portion; two wing portions extending laterally from the body portion, each wing portion having a tail portion and two lateral arms connecting said wing portion to body portion, said body portion defining first through holes at a front and a rear end, one of said lateral arms defining a second through hole, said tail portions each defining an elongated hole.

4. The improved chassis structure as claimed in claim 1, wherein said control box comprises a first front angled fixing plate; and said arch base also comprises a second front angled fixing plate, wherein said U-shaped seat member defines a central, generally rectangular hole through which said first and second fixing plates are inserted.

5. The improved chassis structure as claimed in claim 2, wherein said battery support of said arch base defines a charging socket hole and a circuit wire opening located near the front end of said battery support, and wherein said safety controller support defines an opening located near a rear end of said safety controller support for installing circuit wires of said motor and a receiving antenna of the safety controller.

* * * * *